May 6, 1969          W. LEHNER          3,442,552

DRIVER'S SEAT, ESPECIALLY FOR TRACTORS OR THE LIKE

Filed March 22, 1967

INVENTOR
Wilhelm Lehner
BY Spencer & Kaye
Attorneys

United States Patent Office 3,442,552
Patented May 6, 1969

3,442,552
DRIVER'S SEAT, ESPECIALLY FOR TRACTORS OR THE LIKE
Wilhelm Lehner, Sebastian-Kneipp-Strasse 98, Amberg, Germany
Filed Mar. 22, 1967, Ser. No. 625,170
Claims priority, application Germany, Mar. 25, 1966, G 46,415
Int. Cl. A47c 1/02
U.S. Cl. 297—334                              7 Claims

ABSTRACT OF THE DISCLOSURE

A driver's seat especially for a tractor or the like which is easily movable away from its normal position so as to permit the driver to stand up behind the steering wheel. The seat has a seat part and a back part and the mounting means are provided which permit the seat part to be pivoted upwardly and toward the rear from the normal position to a substantially vertical position substantially in engagement with the seat part. The mounting means include a mounting frame behind the back rest and carrying the same, guide means which secure and resiliently guide the seat part on the frame in a substantially vertical direction, further means for mounting the rear end of the seat part on the lower end of the frame so as to be pivotable about a horizontal axis extending transverse to the longitudinal direction of the vehicle, at least one arm pivotable at its rear end on the frame and adapted to support the seat, and still further means for slidably connecting the front end of the arm to the seat near the front end thereof so as to permit the arm to pivot upwardly and downwardly together with the seat.

Background of the invention

The present invention relates to a driver's seat for a motor vehicle, and especially for a tractor, bulldozer, fork-lift truck, or the like.

It is conventional in any motor vehicle to mount the driver's seat in a position behind and underneath the steering wheel and the controls of the vehicle so that these controls are within easy reach of the driver. The front edge of the driver's seat is therefore located underneath the steering wheel, while the space at one side of the driver's seat is usually occupied by the gear-shift lever and other means.

Although various constructions are known for adjusting the position of the seat to a minor extent in the longitudinal direction of the vehicle, for pivoting the back rest of a seat of a passenger car in the forward direction, and for tilting the entire driver's seat of a tractor forwardly at an angle of about 45° so as to permit rain water to run off the seat, it has so far not been possible to remove the entire seat very easily and quickly from the area which it occupies during the normal operation of the vehicle. This renders it difficult for the driver to enter the area behind the steering wheel so as to occupy his seat since the steering wheel is located above the position for the driver's feet and the driver must therefore squeeze in a very uncomfortable position into his seat. Furthermore, the irremovability of the seat prevents the driver from steering the vehicle while standing up. This is, however, often very desirable especially in industrial and agricultural vehicles so as to permit the driver to look better around in all directions and especially also toward the rear. It would also permit the driver after tiring from driving for a long time in a sitting position to overcome his fatigue by being able to stand up and continue driving the vehicle for a short time in such erect position.

Summary of the invention

It is therefore an object of the present invention to design the driver's seat especially of an industrial or agricultural motor vehicle so as to enable the driver to mount his seat more easily than this has hitherto been possible and also to enable him to steer his vehicle while standing up.

For attaining this object, the invention provides the driver's seat to be movable to a position in which the space which the driver normally occupies while driving in a sitting position will be free so as to permit him to stand up and to continue driving in a standing position. The driver may therefore either remove the seat from its normal position so as to drive the vehicle while standing up or he may move the seat back to its normal position so as to continue driving in the sitting position. Such moveability of the seat also permits the driver to mount his seat more easily since he can enter the vehicle without being hampered by the steering wheel and can thereafter move the seat beneath him.

Accordingly the invention provides the seat either to be capable of swiveling about a horizontal axis toward the rear or toward one side, or to be movable from its horizontal position along a curved track toward the rear to a substantially vertical position. If the seat is provided with a back rest, it is advisable to design the seat so as to be capable of pivoting to a substantially vertical position in which its upper surface engages upon the back rest.

For a tractor seat which is mounted on a frame which is located behind the back rest and on which the seat is resiliently secured so as to be movable in a substantially vertical direction, and wherein the front part of the seat is supported on at least one arm which is pivotable about an axis which is located underneath the seat, the invention provides the entire seat part to be pivotable about a horizontal axis extending transverse to the longitudinal direction of the vehicle, while the supporting arm or arms are slidable at their front end within a substantially horizontal guide track on the seat part. In this manner it is possible by very simple means to move a driver's seat, which is resilient in a vertical direction and braced near its front end by at least one supporting arm, away from its normal position behind and underneath the steering wheel. The seat part may therefore be pivoted upwardly and toward the rear about an axis which is preferably located near its rear edge, and it will then also take along and pivot the supporting arms.

These and further features and advantages of the present invention will become more clearly apparent from the following detailed description thereof which is to be read with reference to the accompanying drawings, in which—

FIGURE 2 shows the seat according to FIGURE 1 in the position in which the seat part is pivoted upwardly against the back rest; while

Figure 1:
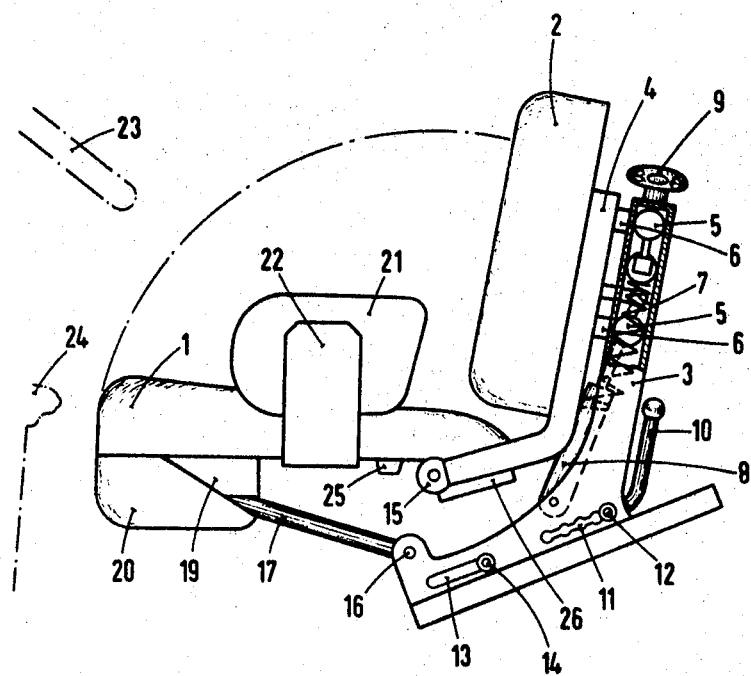
FIGURE 1 shows, partly in section, a side view of the seat construction according to the invention, in which the seat part is located in its normal, substantially horizontal position.

As shown particularly in FIGURE 1 of the drawings, the vehicle seat comprises a supporting frame 4 which carries the seat part 1 and the back rest 2. This frame 4 is provided with rearwardly extending projections 6 on which rollers 5 are mounted which are movable within a substantially vertical guide on a mounting frame 3. This frame 3 is mounted on the vehicle by means of bolts 12 and 14 which are slidable within longitudinal slots 11 and 13 which are obliquely inclined so that an adjustment of the seat in the longitudinal direction of the vehicle also results in an adjustment of the height of the seat. For locking the frame 3 in the adjusted position, a locking lever 10 is provided. The seat is resiliently supported by a coil spring 7, one end of which is secured to the seat frame 4, while its other end is secured to the mounting frame 3. For controlling the resilience of the seat, a shock absorber 8 is provided which likewise acts between the two frames 3 and 4.

The lower front end of the mounting frame 3 carries a transverse member which is pivotable on a pair of pivots 16 about a horizontal axis and carries a pair of arms 17 the front ends of which support the seat part 1 when in its normal horizontal position.

According to the invention, the seat part 1 is pivotable about a pair of pivots 15 which extends horizontally and transverse to the longitudinal direction of the vehicle on the rear end of seat 1. When the seat part 1 is being pivoted upwardly, the front end of the arms 17 slide along guide tracks 19 which are provided on the lower side of the seat part 1. The front ends of the arms 17 are for this purpose provided with guide rollers 18.

Since within the mounting frame 3 at least two rollers 5 are guided underneath each other, the seat part 1 cannot be drawn forwardly but can only be pivoted upwardly toward the rear. By means of lateral brackets 22 on the seat part 1, the latter is provided with lateral leg supports 21 which are movable together with the seat part 1. The lower side of the seat part 1 is further preferably provided with a cushion 20 against which the driver may lean when standing up and the seat part is pivoted upwardly.

Figure 3:
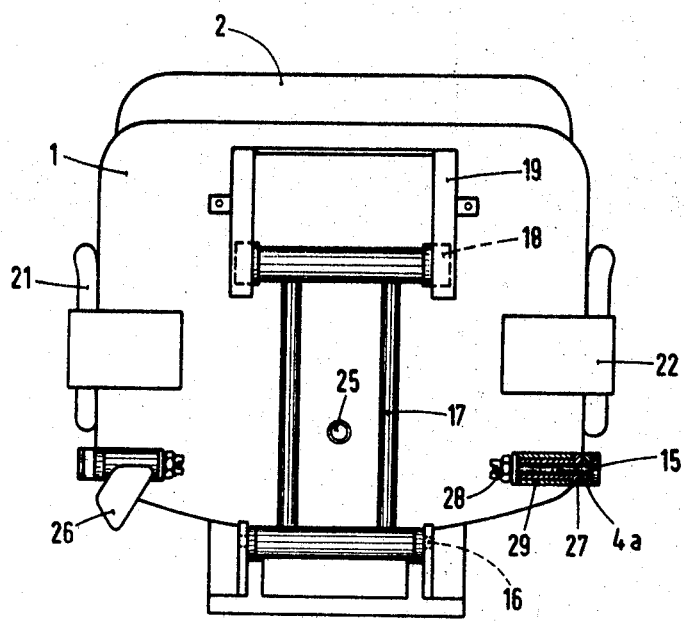
FIGURE 3 shows a bottom view of the seat part.

As illustrated in FIGURE 3, the two guide arms 17 are connected to each other so as to form a frame. The pivots 15 for the seat part 1 are mounted on a pair of lateral arms which project at an oblique angle downwardly and forwardly from the lower end of frame 4. The front ends of these arms form eyes 4a which are in alignment with bushings 29 on the lower side of the seat part near its rear edge. Each pivot pin 15 is inserted through one of these eyes 4a and a bushing 29. Between each pivot pin 15 and the bushing 29 a sleeve 27 of plastic is inserted which is provided with a flange which is clamped between the eye 4a and the bushing 29 by means of a nut 28 on the inner end of pivot pin 15. These nuts 28 may be so strongly tightened that the seat part 1 will be held in the particular position to which it is adjusted by the friction on each sleeve 27 or the flange thereof. These simple means thus prevent the seat part 1 from unintentionally pivoting downwardly. Each bushing 29 is further provided with a projection 26 which extends substantially toward the rear. These projections serve as supports which engage upon the ends of the arms of frame 4 when the seat part 1 is pivoted to its horizontal position so that the load on the guide arms 17 will be partly relieved. If desired, it is also possible to insert suitable spring elements between the projections 26 and the arms of frame 4.

Figure 2:
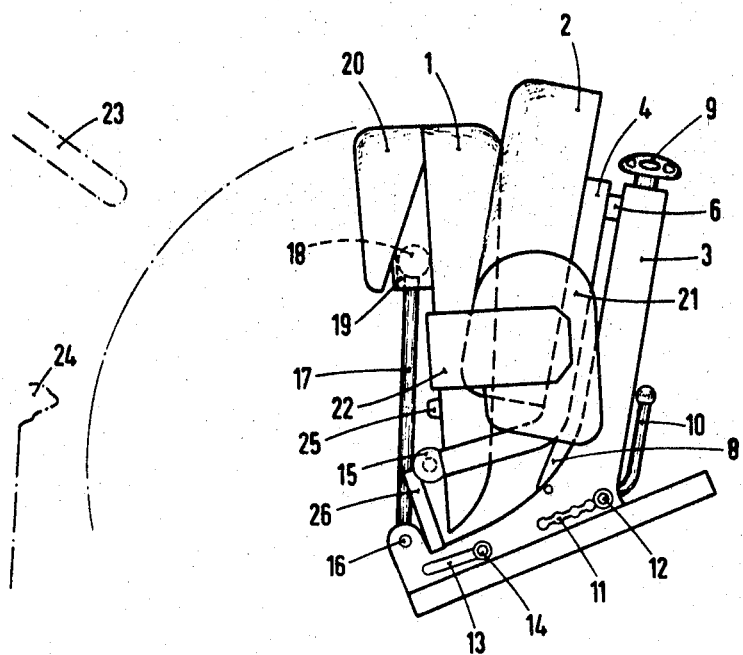

FIGURES 1 and 2 also indicate the position of the seat and its arc of swing in relation to the steering wheel 23 and the gear-shift lever 24 of the vehicle.

Although my invention has been illustrated and described with reference to the preferred embodiment thereof, I wish to have it understood that it is in no way limited to the details of such embodiment but is capable of numerous modifications within the scope of the appended claims.

Having thus fully disclosed my invention what I claim is:

1. A driver's seat for a motor vehicle comprising means for mounting said seat in the normal, substantially horizontal position behind the steering wheel and for permitting said seat to be quickly moved away from and back to said normal position so as to permit the driver to stand up easily behind said steering wheel or to sit on said seat, respectively, said seat having a seat part and a back rest, said mounting means permitting said seat part to be pivoted upwardly and toward the rear from said normal position to a substantially vertical position substantially in engagement with said back rest, said mounting means comprising a mounting frame behind said back rest and carrying the same, guide means for securing and resiliently guiding said seat part on said frame in a substantially vertical direction, means for mounting the rear end of said seat part on the lower end of said frame so as to be pivotable about a horizontal axis extending transverse to the longitudinal direction of said vehicle, at least one arm pivotable at its rear end on said frame and adapted to support said seat, and means for slidably connecting the front end of said arm to said seat near the front end thereof so as to permit said arm to pivot upwardly and downwardly together with said seat.

2. A driver's seat as defined in claim 1, wherein said guide means extend in a substantially vertical direction on said frame, and at least two rollers disposed underneath each other and guided within said guide means and rotatably mounted on said back rest.

3. A driver's seat as defined in claim 1, further comprising a second frame interposed between said mounting frame and said back rest and carrying the latter, said second frame having a pair of arms on its lower end projecting obliquely forwardly, and pivot means on the free ends of said arms for pivotably supporting said seat near the rear end thereof.

4. A driver's seat as defined in claim 3, wherein said mounting means comprise a pair of bushings secured to the opposite lateral sides of said seat part near the rear end thereof, an eye member on the lower end of each of said arms of said second frame, and a pivot pin inserted into and pivotably connecting each of said bushings and one of said eye members.

5. A driver's seat as defined in claim 4, further comprising a sleeve of plastic inserted between each of said pivot pins and said bushings and having a flange thereon, and means for clamping said flange between said eye member and said bushing.

6. A driver's seat as defined in claim 5, wherein each of said pivot pins has a threaded end, said clamping means comprising a nut on said threaded end.

7. A driver's seat as defined in claim 3, further comprising an abutment projecting substantially toward the rear from each side of said seat part near the rear end thereof and adapted to engage upon one of said arms of said second frame when said seat part is in its substantially horizontal position.

References Cited

UNITED STATES PATENTS

| 820,344 | 5/1906 | Brierley | 297—324 |
|---|---|---|---|
| 1,231,129 | 6/1917 | Cluff | 297—334 |
| 1,355,005 | 10/1920 | Schechter | 297—324 |
| 1,621,520 | 3/1927 | Snyder | 297—308 |
| 1,767,757 | 6/1930 | Harris | 297—307 |
| 2,509,739 | 5/1950 | McDonald | 297—331 |
| 3,139,304 | 6/1964 | Lehner et al. | 297—308 |
| 3,304,044 | 2/1967 | Campbell et al. | 297—334 |

FOREIGN PATENTS 382,629  10/1932  Great Britain.

FRANCIS K. ZUGEL, *Primary Examiner.*

U.S. Cl. X.R.

297—307